US012473716B2

(12) United States Patent
Mori et al.

(10) Patent No.: US 12,473,716 B2
(45) Date of Patent: Nov. 18, 2025

(54) ELECTRICALLY DRIVEN CONSTRUCTION MACHINE DRIVING SYSTEM

(71) Applicant: Hitachi Construction Machinery Tierra Co., Ltd., Koka (JP)

(72) Inventors: Kazushige Mori, Koka (JP); Kiwamu Takahashi, Moriyama (JP); Ryoya Inoue, Rittou (JP); Yuki Koto, Koka (JP)

(73) Assignee: HITACHI CONSTRUCTION MACHINERY TIERRA CO., LTD., Koka (JP)

( * ) Notice: Subject to any disclaimer, the term of this patent is extended or adjusted under 35 U.S.C. 154(b) by 0 days.

(21) Appl. No.: 18/689,481

(22) PCT Filed: Dec. 13, 2022

(86) PCT No.: PCT/JP2022/045901
§ 371 (c)(1),
(2) Date: Mar. 6, 2024

(87) PCT Pub. No.: WO2023/188579
PCT Pub. Date: Oct. 5, 2023

(65) Prior Publication Data
US 2024/0360650 A1   Oct. 31, 2024

(30) Foreign Application Priority Data
Mar. 28, 2022   (JP) .................. 2022-052448

(51) Int. Cl.
E02F 9/20   (2006.01)
(52) U.S. Cl.
CPC ............ *E02F 9/2095* (2013.01); *E02F 9/207* (2013.01); *E02F 9/2091* (2013.01)
(58) Field of Classification Search
None
See application file for complete search history.

(56) References Cited

U.S. PATENT DOCUMENTS 7,973,499 B2 *   7/2011   Yoshioka ................ B60L 3/003
318/434

FOREIGN PATENT DOCUMENTS

JP   60-038561 B2   9/1985
JP   2000-319932 A   11/2000
(Continued)

OTHER PUBLICATIONS

International Preliminary Report on Patentability received in corresponding International Application No. PCT/JP2022/045901 dated Oct. 10, 2024.
(Continued)

*Primary Examiner* — Abdhesh K Jha
(74) *Attorney, Agent, or Firm* — MATTINGLY & MALUR, PC

(57) ABSTRACT

In an electrically driven construction machine, decrease in the remaining electric power storage amount of an electric power storage device is reduced when a transition to auto idle control takes place in case where the remaining electric power storage amount is small, and the duration over which the remaining electric power storage amount of the electric power storage device lasts is lengthened. Accordingly, a controller 31 controls the rotation speed of an electric motor 1 such that the rotation speed of the electric motor 1 is lowered from a predetermined rotation speed to an idle rotation speed Ni when none of a plurality of operation devices 20, 21, 22, 23a, 23b, and 24 is manipulated and a predetermined time duration TD has elapsed. In addition, when the remaining electric power storage amount of an electric power storage device 33 is equal to or smaller than a first threshold Ea, the controller 31 sets the predetermined time duration TD shorter than when the remaining electric power storage amount is greater than the first threshold Ea.

4 Claims, 7 Drawing Sheets

(56) References Cited

FOREIGN PATENT DOCUMENTS

| | | |
|---|---|---|
| JP | 2009-256988 A | 11/2009 |
| JP | 2010-121328 A | 6/2010 |
| JP | 2013-129976 A | 7/2013 |

OTHER PUBLICATIONS

International Search Report of PCT/JP2022/045901 dated Feb. 14, 2023.

* cited by examiner

FIG. 2

ELECTRICALLY DRIVEN CONSTRUCTION MACHINE DRIVING SYSTEM

TECHNICAL FIELD

The present invention relates to an electrically driven construction machine driving system that lowers the rotation speed of an electric motor to a low-speed idle rotation speed when there has not been manipulation for a predetermined time duration.

BACKGROUND ART

Many construction machines such as hydraulic excavators use a diesel engine as a motive power source, and perform work by actuating hydraulic actuators using a hydraulic fluid supplied from hydraulic pumps coupled to the diesel engine. Instructions for operation of the hydraulic actuators are given by lever manipulation of operation lever devices. For a driving system in such a construction machine, auto idle control is adopted in which the rotation speed of an engine is lowered to a low-speed idle rotation speed when there has not been lever manipulation of operation lever devices for a predetermined time duration, as described in Patent Document 1, for example.

Meanwhile, in recent years, from the view point of enhancement of fuel efficiency, improvement of exhaust gas characteristics, noise reduction, and the like, a work machine such as an electrically driven hydraulic excavator has been developed and put into practical use, in which an electric power storage device (battery) is mounted as a driving source, and an electric motor is driven with electric power of the electric power storage device to drive hydraulic pumps.

As such an electrically driven construction machine, Patent Document 2 discloses a technology that when there has not been lever manipulation of operation lever devices for a predetermined time duration, the rotation speed of an electric motor is lowered and auto idle control is performed, similarly to a construction machine that drives hydraulic pumps with an engine.

PRIOR ART DOCUMENT

Patent Documents

Patent Document 1: JP-S60-038561-B2
Patent Document 2: JP-2010-121328-A

SUMMARY OF THE INVENTION

Problem to be Solved by the Invention

In the electrically driven construction machine described in Patent Document 2, when there has not been lever manipulation for a predetermined time duration, the rotation speed of the electric motor is lowered, and auto idle control is performed, to thereby reduce electric power consumption. In an electrically driven construction machine whose driving source is an electric power storage device, it takes longer time for charging the electric power storage device than for refueling a typical construction machine, undesirably. Accordingly, it is important to lengthen the duration over which the remaining electric power storage amount of the electric power storage device lasts. However, in Patent Document 2, the predetermined time duration taken for a transition to auto idle control is constant, and electric power consumption cannot be reduced in a situation where no lever manipulation is performed before the transition to auto idle control. Therefore, it has not been possible to lengthen the duration over which the remaining electric power storage amount of an electric power storage device lasts.

An object of the present invention is to provide an electrically driven construction machine driving system that enables to reduce decrease in the remaining electric power storage amount of an electric power storage device when a transition to auto idle control takes place in a case where the remaining electric power storage amount is small, and to lengthen the duration over which the remaining electric power storage amount of the electric power storage device lasts.

Means for Solving the Problem

In order to achieve the object described above, the present invention provides an electrically driven construction machine driving system including: an electric motor; a hydraulic pump driven by the electric motor; a plurality of actuators driven by a hydraulic fluid delivered from the hydraulic pump; a plurality of operation devices for operating the plurality of actuators; an electric power storage device that provides electric power to the electric motor; and a controller that controls a rotation speed of the electric motor, the controller being configured to drive the electric motor at a predetermined rotation speed when any one of the plurality of operation devices is manipulated, and execute auto idle control to lower the rotation speed of the electric motor from the predetermined rotation speed to a low-speed idle rotation speed when none of the plurality of operation devices is manipulated, and a predetermined time duration has elapsed. Further, in the electrically driven construction machine driving system, the controller is configured to, when a remaining electric power storage amount of the electric power storage device is equal to or smaller than a first threshold, set the predetermined time duration to be shorter than when the remaining electric power storage amount is greater than the first threshold.

In this manner, according to the present invention, when the remaining electric power storage amount of the electric power storage device is equal to or smaller than the first threshold, the predetermined time duration is set to be shorter than when the remaining electric power storage amount is greater than the first threshold, and therefore it is possible to reduce the electric power consumption amount of the electric power storage device during the predetermined time duration, by an amount corresponding to the reduction of the predetermined time duration, thereby to reduce decrease in the remaining electric power storage amount of the electric power storage device when a transition to auto idle control takes place in a case where the remaining electric power storage amount is small, and to lengthen the duration over which the remaining electric power storage amount of the electric power storage device lasts.

Advantages of the Invention

According to the present invention, it is possible to reduce decrease in the remaining electric power storage amount of an electric power storage device when a transition to auto idle control takes place in a case where the remaining electric power storage amount is small, and to lengthen the duration over which the remaining electric power storage amount of the electric power storage device lasts, and thereby to operate a construction machine for a long time with one charge.

BRIEF DESCRIPTION OF THE DRAWINGS

FIG. 2 is a figure depicting an electrically driven hydraulic excavator driving system according to the first embodiment of the present invention.

MODES FOR CARRYING OUT THE INVENTION

Hereinbelow, embodiments of the present invention are explained in detail on the basis of the figures.

First Embodiment

A first embodiment of the present invention is explained.
~Construction Machine~

Figure 1:
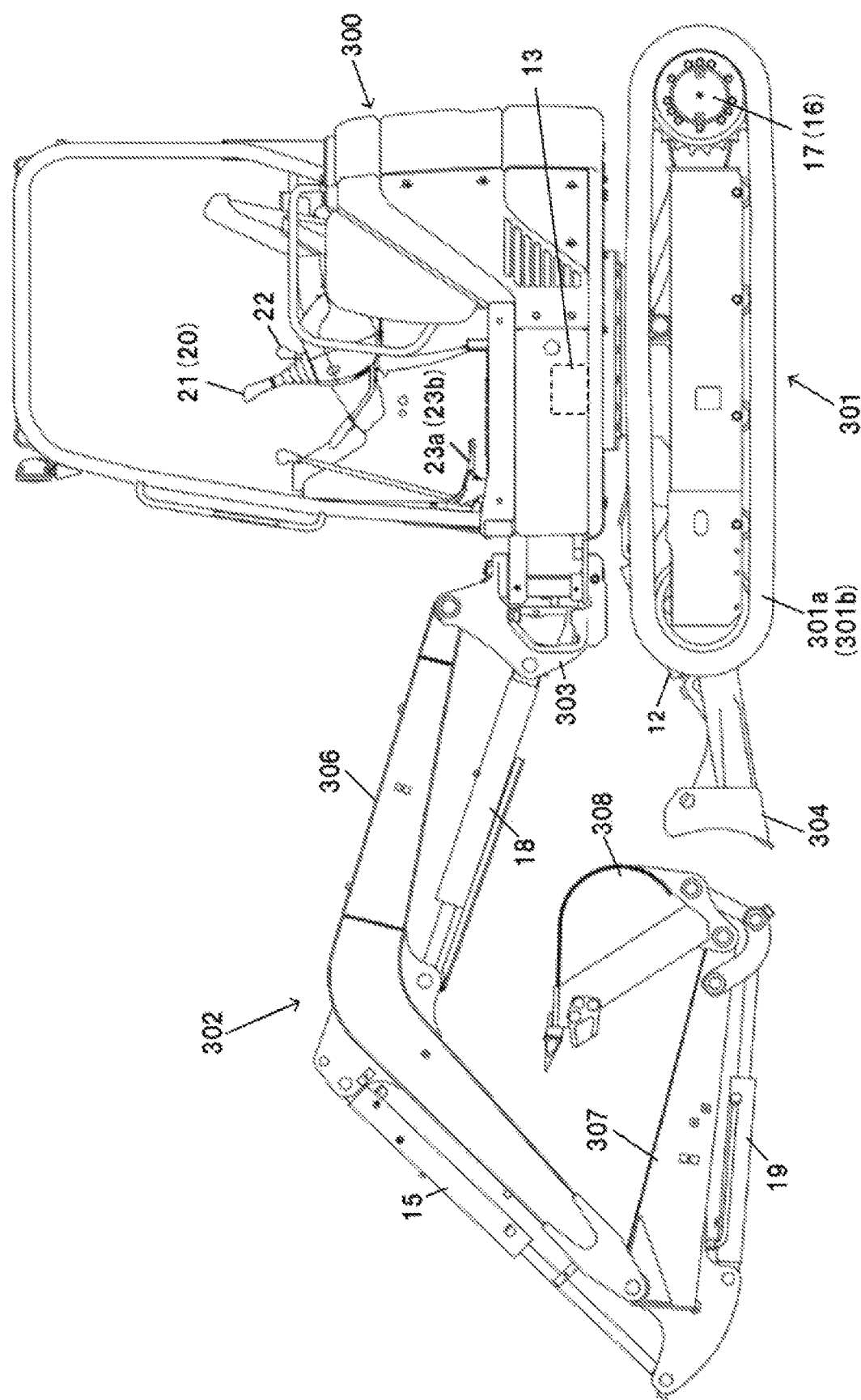
FIG. 1 is a side view of an electrically driven construction machine including a driving system in a first embodiment of the present invention.

FIG. 1 is a side view of an electrically driven construction machine including a driving system in a first embodiment of the present invention. In the present embodiment, the electrically driven construction machine is a crawler type hydraulic excavator, which is a representative example of construction machines.

In FIG. 1, the electrically driven hydraulic excavator in the present embodiment includes an upper swing structure 300, a lower travel structure 301, and a front work implement 302. The upper swing structure 300 can swing relative to the lower travel structure 301 by manipulating an operation lever device 21 to rotate a swing motor 13. A swing post 303 is attached to a front section of the upper swing structure 300, and the front work implement 302 is vertically movably attached to the swing post 303. The front work implement 302 includes a boom 306, an arm 307, and a bucket 308. The boom 306, the arm 307, and the bucket 308 are driven, and the posture of the front work implement 302 is changed by manipulating an operation lever device 20 and the operation lever device 21, and causing a boom cylinder 18, an arm cylinder 15, and a bucket cylinder 19 to extend and retract. The lower travel structure 301 includes left and right crawler type travel devices 301a and 301b. The travel devices 301a and 301b are driven and caused to travel by manipulating operation pedal devices 23a and 23b, and rotating left and right travel motors 17 and 16. A blade 304 is attached to a middle frame between the left and right crawler type travel devices 301a and 301b. The blade 304 is caused to perform up-down operation by manipulating an operation lever device 22, and causing a blade cylinder 12 to extend and retract. Furthermore, the swing post 303 is pivoted leftward or rightward by manipulating an operation pedal device 24 (see FIG. 2), and causing a swing cylinder 14 (see FIG. 2) to extend and retract.

~Driving System~

Figure 2:
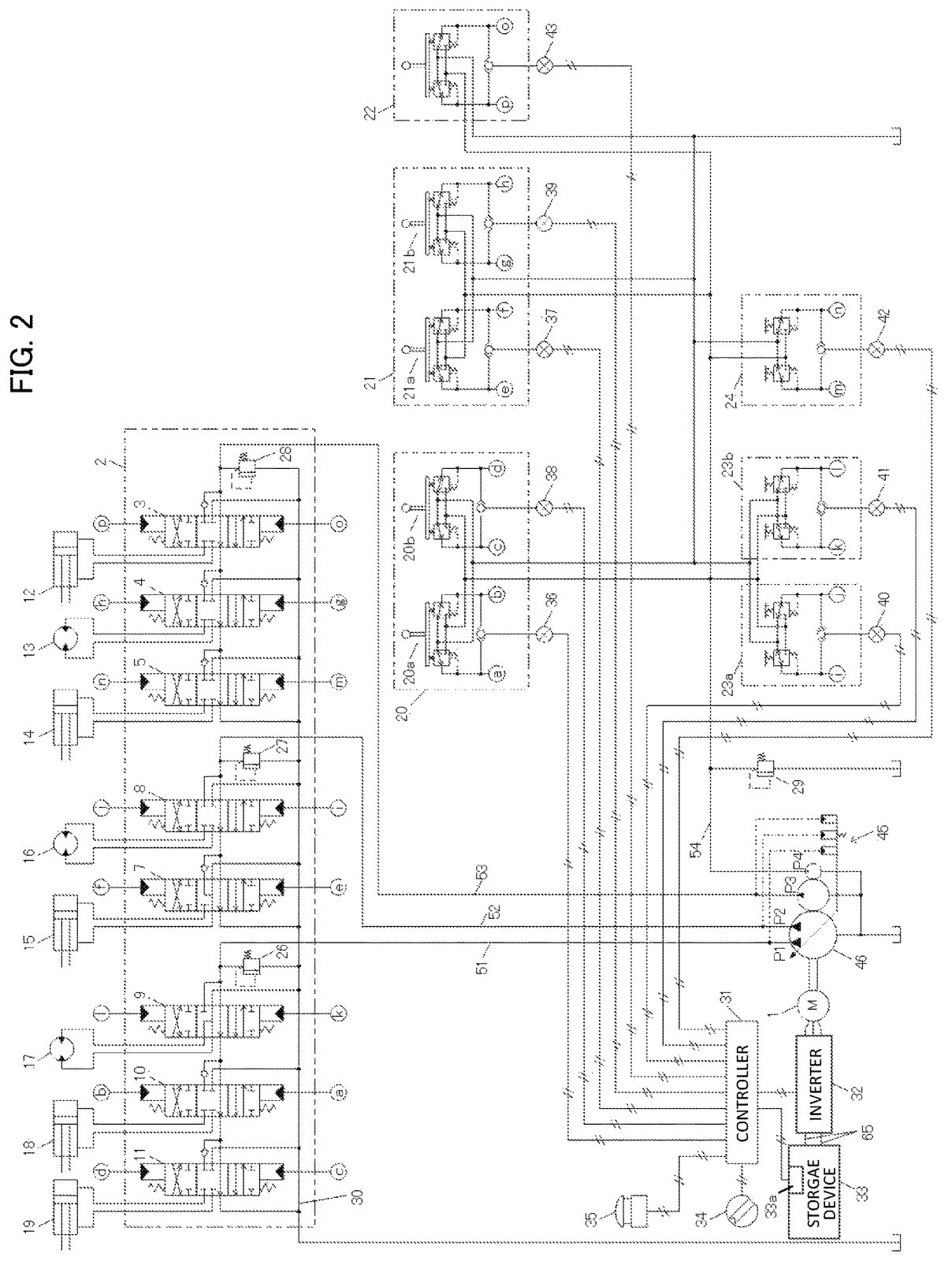

FIG. 2 is a figure depicting an electrically driven hydraulic excavator driving system according to the present embodiment.

In FIG. 2, the driving system of the present embodiment includes: an electric motor 1; a first hydraulic pump P1, a second hydraulic pump P2, and a third hydraulic pump P3 that are main pumps driven by the electric motor 1; a pilot pump P4 driven by the electric motor 1 in conjunction with the main pumps P1, P2, and P3; the left and right travel motors 17 and 16, the boom cylinder 18, the bucket cylinder 19, the arm cylinder 15, the blade cylinder 12, the swing motor 13, and the swing cylinder 14 mentioned above that are a plurality of actuators driven by a hydraulic fluid delivered from the first, second, and third hydraulic pumps P1, P2, and P3; a plurality of directional control valves 3 to 5 and 7 to 11 that control flows of the hydraulic fluid supplied from the first, second, and third hydraulic pumps P1, P2, and P3 to the plurality of actuators 12 to 19; the operation lever devices 20, 21, and 22 and operation pedal devices 23a, 23b, and 24 mentioned above that are a plurality of operation devices for switching the plurality of directional control valves 3 to 5 and 7 to 11, and operating the plurality of actuators 12 to 19; and a pilot relief valve 29 that is connected to a hydraulic fluid supply line 54 of the pilot pump P4, and keeps the pressure of the pilot pump P4 constant.

The first hydraulic pumps P1 and P2 are variable displacement hydraulic pumps, and includes a split flow type hydraulic pump 46. The third hydraulic pump P3 is a fixed displacement hydraulic pump. The split flow type hydraulic pump 46 includes a regulator 45 that performs horsepower limit control such that the total absorption horsepower of the first, second, and third hydraulic pumps P1, P2, and P3 does not exceed a maximum horsepower.

The directional control valves 3 to 5 and 7 to 11 are open center directional control valves arranged in a control valve 2. The directional control valves 9, 10, and 11 are connected to the first hydraulic pump P1 via a hydraulic fluid supply line 51, and control flows of the hydraulic fluid supplied from the first hydraulic pump P1 to the actuators 17, 18, and 19, respectively. The directional control valves 7 and 8 are connected to the second hydraulic pump P2 via a hydraulic fluid supply line 52, and control flows of the hydraulic fluid supplied from the second hydraulic pump P2 to the actuators 15 and 16, respectively. The directional control valves 3, 4, and 5 are connected to the third hydraulic pump P3 via a hydraulic fluid supply line 53, and control flows of the hydraulic fluid supplied from the third hydraulic pump P3 to the actuators 12, 13, and 14, respectively. The hydraulic fluid supply lines 51, 52, and 53 are connected with main relief valves 26, 27, and 28 that limit the delivery pressures of the first, second, and third hydraulic pumps P1, P2, and P3, respectively.

The operation lever devices 20, 21, and 22 and the operation pedal devices 23a, 23b, and 24 generate operation pressures a, b, c, d, e, f, g, h, i, j, k, l, m, n, o, and p for switching the directional control valves 3 to 5 and 7 to 11 using the hydraulic fluid supply line 54 of the pilot pump P4 as a pilot hydraulic pressure source.

Operation levers of the operation lever devices 20 and 21 can be manipulated in all direction with the up and down directions and the left and right directions as reference directions. The operation lever device 20 functions as a boom operation lever device 20a and a bucket operation lever device 20b according to the manipulating direction of the operation lever. The operation lever device 21 functions as an arm operation lever device 21a and a swing operation lever device 21b according to the manipulating direction of the operation lever. The operation lever device 22 is used for operating a blade, the operation pedal device 23a is used for traveling rightward, the operation pedal device 23b is used for traveling leftward, and the operation pedal device 24 is used for front swing operation.

In addition, the driving system of the present embodiment includes: a controller 31 that controls the rotation speed of the electric motor 1; an inverter 32 that operates on the basis of a rotation speed command output from the controller 31; an electric power storage device 33 that is connected to the inverter 32 via a direct current electric power supply line 65, and supplies electric power to the electric motor 1; a rotation speed dial 34 that gives an instruction for a reference rotation speed Nr of the electric motor 1; an auto idle switch 35 that turns on and off auto idle control; and a pressure sensor 36 that senses the operation pressures (boom operation pressures) a and b of the operation lever device 20a, a pressure sensor 38 that senses the operation pressures (bucket operation pressures) c and d of the operation lever device 20b, a pressure sensor 37 that senses the operation pressures (arm operation pressures) e and f of the operation lever device 21a, a pressure sensor 39 that senses the operation pressures (swing operation pressures) g and h of the operation lever device 21b, a pressure sensor 40 that senses the operation pressures (travel-right operation pressures) i and j of the operation pedal device 23a, a pressure sensor 41 that senses the operation pressures (travel-left operation pressures) k and l of the operation pedal device 23b, a pressure sensor 42 that senses the operation pressures (front swing operation pressures) m and n of the operation pedal device 24, and a pressure sensor 43 that senses the operation pressures (blade operation pressures) o and p of the operation lever device 22.

The electric power storage device 33 includes an electric power storage controller 33a. The electric power storage controller 33a performs input/output control of electric power of the electric power storage device 33, calculates the remaining electric power storage amount, and outputs remaining electric power storage amount information to the controller 31. Note that the remaining electric power storage amount may be calculated by a portion other than the electric power storage controller 33a of the electric power storage device 33, and output to the controller 31. In addition, the remaining electric power storage amount may be expressed as a state of charge (SOC), or may be expressed as another parameter such as a voltage.

The controller 31 receives input of an instruction signal of the rotation speed dial 34, an auto idle control ON signal of the auto idle switch 35, sensing signals of the pressure sensors 36, 37, 38, 39, 40, 41, 42, and 43, and the remaining electric power storage amount information about the electric power storage device 33, performs a predetermined computation process, and controls the rotation speed of the electric motor 1 by outputting the rotation speed command to the inverter 32.

Hereinbelow, the content of a process performed by the controller 31 is explained.

The controller 31 is, as its general function, configured to receive input of manipulation information of a plurality of the operation devices 20, 21, 22, 23a, 23b, and 24, determines whether or not any one of the plurality of operation devices 20, 21, 22, 23a, 23b, and 24 is manipulated on the basis of the manipulation information, and control the rotation speed of the electric motor 1 such that; the electric motor 1 is driven at a predetermined rotation speed when any one of the plurality of operation devices 20, 21, 22, 23a, 23b, and 24 is manipulated; and auto idle control is executed to lower the rotation speed of the electric motor 1 from the predetermined rotation speed to an idle rotation speed Ni when none of the plurality of operation devices 20, 21, 22, 23a, 23b, and 24 is manipulated and a predetermined time duration (delay) has elapsed.

Figure 5:
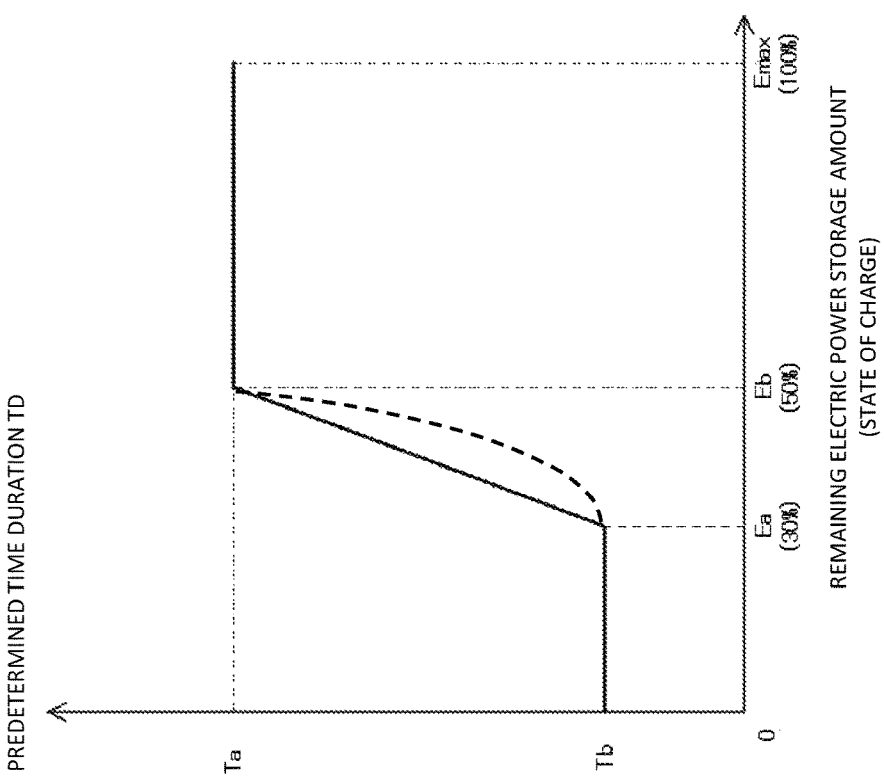
FIG. 5 is a figure depicting the relationship between a remaining electric power storage amount and a predetermined time duration set in a predetermined time duration computation table.

In addition, the controller 31 is, as its characteristic function, configured to receive input of the remaining electric power storage amount information about the electric power storage device 33, compute the predetermined time duration on the basis of the remaining electric power storage amount represented by the remaining electric power storage amount information, and compute the predetermined time duration to be shorter when a remaining electric power storage amount of the electric power storage device 33 is equal to or smaller than a first threshold Ea than when the remaining electric power storage amount is greater than the first threshold Ea (see FIG. 5).

Furthermore, in the present embodiment, the controller 31 is configured to compute the predetermined time duration that continuously decreases during a time when the remaining electric power storage amount decreases from a second threshold Eb (see FIG. 5), which is greater than the first threshold Ea, to the first threshold Ea.

Hereinbelow, detail of the content of a process performed by the controller 31 are explained.

Figure 3:
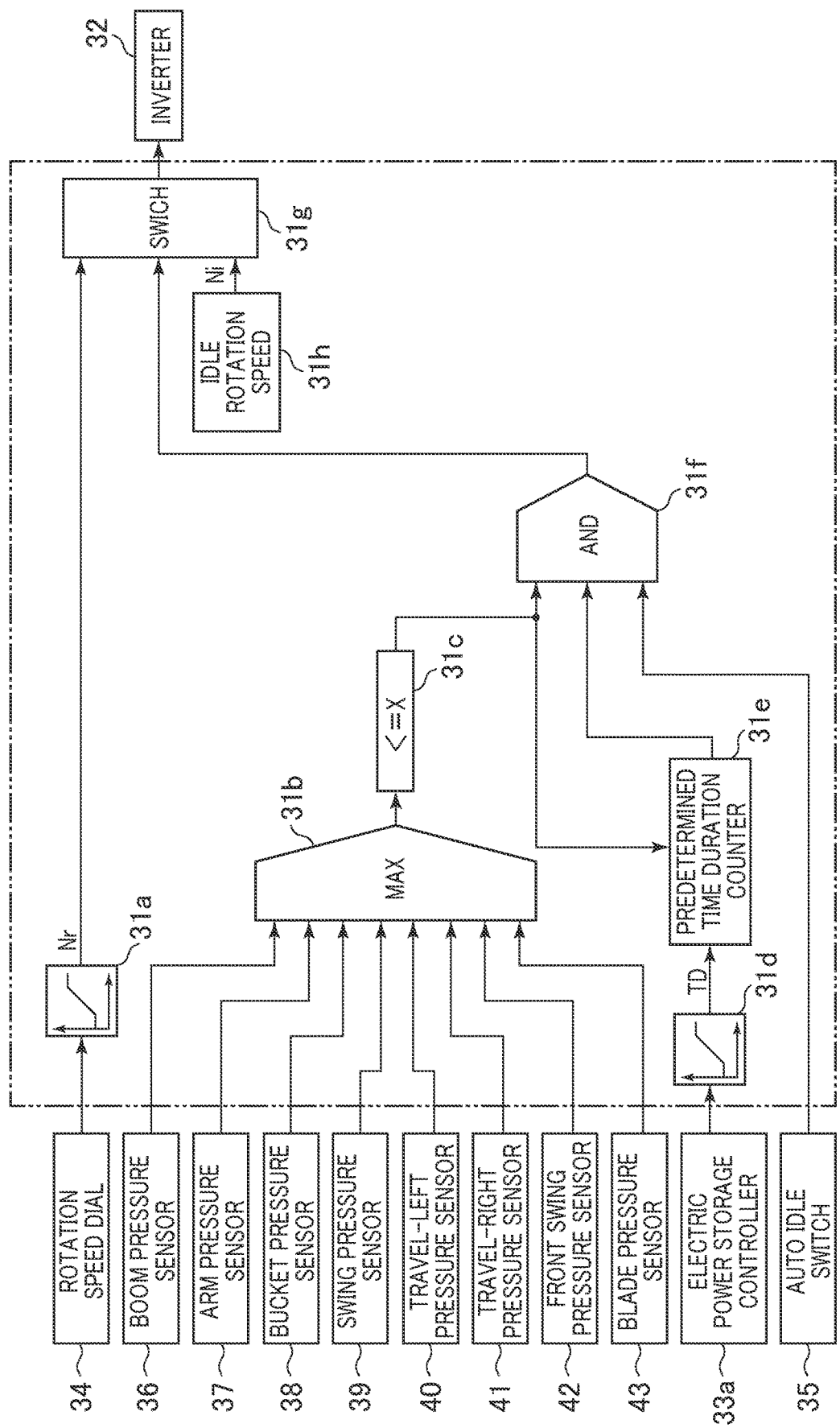
FIG. 3 is a functional block diagram depicting details of the content of a process performed by a controller.

FIG. 3 is a functional block diagram depicting details of the content of the process performed by the controller 31.

In FIG. 3, the controller 31 has functions of a reference rotation speed computation table 31a, a maximum value selecting section 31b, a determining section 31c, a predetermined time duration computation table 31d, a predetermined time duration counter 31e, an AND circuit 31f, a switch circuit 31g, and an idle rotation speed setting section 31h.

The reference rotation speed computation table 31a receives input of the instruction signal of the rotation speed dial 34, and computes the reference rotation speed Nr of the electric motor 1 corresponding to the instruction signal at that time.

Figure 4:
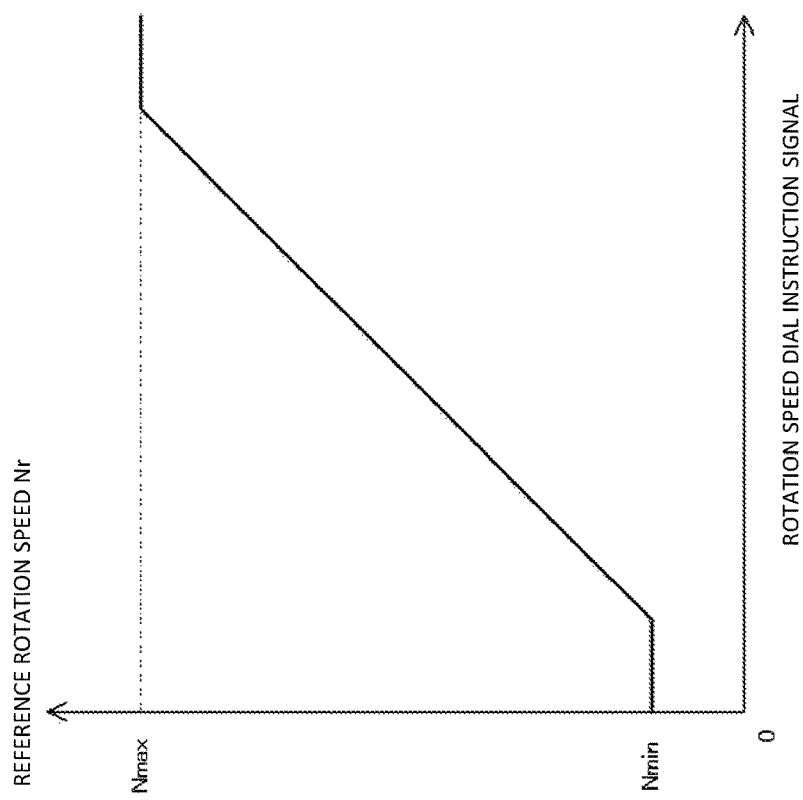
FIG. 4 is a figure depicting the relationship between an instruction signal of a rotation speed dial and a reference rotation speed set in a reference rotation speed computation table.

FIG. 4 is a figure depicting the relationship between the instruction signal of the rotation speed dial 34 and the reference rotation speed Nr set in the reference rotation speed computation table 31a. In the reference rotation speed computation table 31a, the relationship between the instruction signal of the rotation speed dial 34 and the reference rotation speed Nr is set such that the reference rotation speed Nr increases as the instruction signal of the rotation speed dial 34 increases. For example, a minimum value Nrmin of the reference rotation speed Nr is 1200 rpm, and, for example, a maximum value Nrmax of the reference rotation speed Nr is 2000 rpm. The reference rotation speed Nr computed in accordance with the reference rotation speed computation table 31a is input to the switch circuit 31g.

The maximum value selecting section 31b receives input of the sensing signals of the pressure sensors 36 to 43, and selects the maximum value of the boom operation pressures a and b, the bucket operation pressures c and d, the arm operation pressures e and f, the swing operation pressures g and h, the travel-right operation pressures i and j, the travel-left operation pressures k and 1, the front swing operation pressures m and n, and the blade operation pressure o and p represented by the sensing signals, respectively. The selected maximum value of the operation pressures is input to the determining section 31c.

The determining section 31c determines whether or not the maximum value of the operation pressures is equal to or lower than a preset determination pressure XMPa (e.g. 0.5 MPa; the maximum value of the operation pressures at which the directional control valves 3, 4, 5, 7, 8, 9, 10, and 11 do not start moving). The determining section 31c determines that any one of the operation levers and operation pedals of the operation devices 20 to 24 is manipulated when the maximum value of the operation pressures is not equal to or lower than XMPa. Further, the determining section 31c determines that none of the operation levers and operation pedals of the operation devices 20 to 24 is manipulated, and all the operation levers and operation pedals are at the neutral positions when the maximum value of the operation pressures is equal to or lower than XMPa. The determining section 31c outputs a non-manipulation signal when it is determined that none of the operation levers and operation pedals of the operation devices 20 to 24 is manipulated, and all the operation levers and operation pedals are at the neutral positions. The non-manipulation signal is input to the predetermined time duration counter 31e and the AND circuit 31f.

The predetermined time duration computation table 31d receives input of the remaining electric power storage amount information about the electric power storage device 33, and computes a predetermined time duration TD of auto idle control corresponding to the remaining electric power storage amount at that time. The predetermined time duration TD computed in accordance with the predetermined time duration computation table 31d is input to the predetermined time duration counter 31e.

FIG. 5 is a figure depicting the relationship between the remaining electric power storage amount and the predetermined time duration TD set in the predetermined time duration computation table 31d. The relationship between the remaining electric power storage amount and the predetermined time duration TD is set in the predetermined time duration computation table 31d such that; the predetermined time duration TD is constant at Ta during a time when the remaining electric power storage amount decreases from a maximum remaining electric power storage amount Emax to the second threshold Eb greater than the first threshold Ea; the predetermined time duration TD decreases, for example, linearly from Ta to Tb during a time when the remaining electric power storage amount decreases from the second threshold Eb to the first threshold Ea; and the predetermined time duration TD is constant at Tb when the remaining electric power storage amount further decreases from the first threshold Ea. The predetermined time duration TD may decrease curvedly as represented by a dotted line in FIG. 5 during a time when the remaining electric power storage amount decreases from the second threshold Eb to the first threshold Ea.

The first threshold Ea is a remaining electric power storage amount with which an advantage of reduction in electric power consumption can be attained due to the shortening of predetermined time duration TD by auto idle control, and the second threshold Eb is a remaining electric power storage amount with which the influence of changes in the predetermined time duration TD on operability is minimized when the predetermined time duration TD is decreased from Ta to Tb.

Where the remaining electric power storage amount is expressed as a state of charge (charging state) SOC, the maximum remaining electric power storage amount Emax is 100%, the first threshold Ea is 30%, for example, and the second threshold Eb is 50%, for example. In addition, where the remaining electric power storage amount is expressed as a stored electric power voltage, the maximum remaining electric power storage amount Emax is 380 V, for example, the first threshold Ea is 345 V, for example, and the second threshold Eb is 355 V, for example.

The predetermined time duration Ta is a predetermined time duration which is used typically for auto idle control, and is four to five seconds, for example. The predetermined time duration Tb is a predetermined time duration with which an advantage of reduction in electric power consumption can be attained due to the shortening of predetermined time duration TD while a transition to auto idle control takes place when the remaining electric power storage amount is equal to or smaller than the first threshold Ea described above, and is one to two seconds, for example.

In this manner, by setting the relationship between the remaining electric power storage amount and the predetermined time duration TD in the predetermined time duration computation table 31d, the controller 31 is configured to compute the predetermined time duration Tb to be shorter when the remaining electric power storage amount is equal to or smaller than the first threshold Ea than when the remaining electric power storage amount is greater than the first threshold Ea. In addition, in the present embodiment, the controller 31 is configured to compute the predetermined time duration TD that continuously decreases during a time when the remaining electric power storage amount decreases from the second threshold Eb, which is greater than the first threshold Ea, to the first threshold Ea.

Returning to FIG. 3, the predetermined time duration counter 31e has a built in timer, and, after receiving input of the non-manipulation signal from the determining section 31c, starts counting, with the timer, the time duration after the input of the non-manipulation signal (hereinafter, called counting simply). In addition, while the non-manipulation signal is being output, the counting of the elapsed time is continued. When the counted elapsed time matches the predetermined time duration TD computed on the basis of the remaining electric power storage amount in accordance with the predetermined time duration computation table 31d, and the predetermined time duration TD has elapsed, a predetermined time duration counting completion signal is output. The predetermined time duration counting completion signal is input to the AND circuit 31f. On the other hand, when the output of the non-manipulation signal from the determining section 31c is stopped before the predetermined time duration TD elapses, which is output from the predetermined time duration computation table 31d, the predetermined time duration counter 31e resets the counting.

The AND circuit 31*f* receives, as mentioned above, input of the non-manipulation signal from the determining section 31*c* when all the operation levers and operation pedals are at the neutral positions, and receives input of the predetermined time duration counting completion signal from the predetermined time duration counter 31*e* when the predetermined time duration TD computed in accordance with the predetermined time duration computation table 31*d* has elapsed after all the operation levers and operation pedals returned to the neutral positions. In addition, when the auto idle switch 35 is turned on, the auto idle control ON signal is input from the auto idle switch 35 to the AND circuit 31*f*.

The AND circuit 31*f* outputs an auto idle condition fulfillment signal after receiving all of the non-manipulation signal, the predetermined time duration counting completion signal, and the auto idle control ON signal. The auto idle condition fulfillment signal is input to the switch circuit 31*g*.

The switch circuit 31*g*, when the auto idle condition fulfillment signal is not output from the AND circuit 31*f* (when any one of the operation levers and operation pedals is manipulated, or the predetermined time duration TD has not elapsed, or the auto idle switch 35 is turned off), selects as the target rotation speed of the electric motor 1, the reference rotation speed Nr based on the instruction signal of the rotation speed dial 34 computed in accordance with the reference rotation speed computation table 31*a*, generates the rotation speed command on the basis of the reference rotation speed Nr, and outputs the rotation speed command to the inverter 32.

On the other hand, the switch circuit 31*g*, when the auto idle condition fulfillment signal is output from the AND circuit 31*f* (where all the operation levers and operation pedals are at the neutral positions, the predetermined time duration TD has elapsed, and the auto idle switch 35 is turned on), selects as the target rotation speed of the electric motor 1, a low-speed idle rotation speed Ni for auto idle control set in the idle rotation speed setting section 31*h*, generates the rotation speed command on the basis of the idle rotation speed Ni, and outputs the rotation speed command to the inverter 32.

The low-speed idle rotation speed Ni for auto idle control is 1300 rpm which is slightly higher than the minimum value Nrmin of the reference rotation speed Nr set on the basis of the instruction signal of the rotation speed dial 34, for example. Hereinbelow, the low-speed idle rotation speed Ni used for auto idle control is called a "low rotation speed" simply, in some cases.

Figure 6:
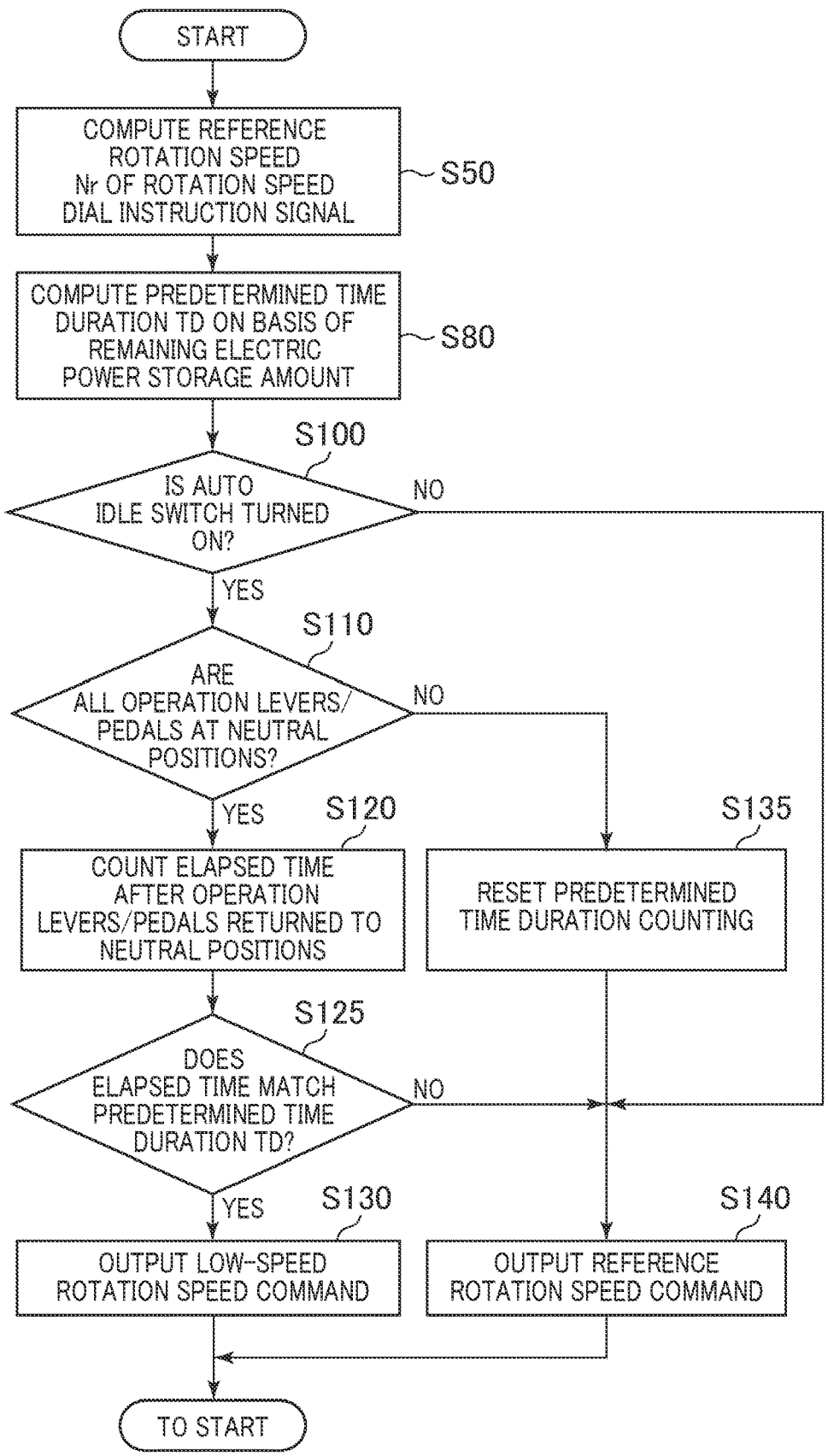
FIG. 6 is a flowchart depicting the procedure of a process performed by the controller.

FIG. 6 is a flowchart depicting the procedure of a process performed by the thus-configured controller 31. Hereinbelow, the operation levers of the operation lever devices 20, 21, and 22, and the operation pedals of the operation pedal devices 23*a*, 23*b*, and 24 are called "operation levers/pedals 20 to 24."

In FIG. 6, the AND circuit 31*f* does not output the auto idle condition fulfillment signal when the auto idle switch 35 is not operated, and auto idle control is turned off. Further, the switch circuit 31*g* outputs the rotation speed command generated on the basis of the reference rotation speed independently of the manipulation states of the operation levers/pedals 20 to 24 by repetition of Steps S50→S80→S100→S140.

In case where all the operation levers/pedals 20 to 24 are in the neutral states when the auto idle switch 35 is switched to turn on auto idle control, the determining section 31*c* outputs the non-manipulation signal. However, the predetermined time duration counter 31*e* does not output the predetermined time duration counting completion signal until the predetermined time duration TD elapses, which is computed on the basis of the remaining electric power storage amount. Accordingly, the switch circuit 31*g* keeps outputting the rotation speed command generated on the basis of the reference rotation speed Nr by repetition of Steps S50→S80→S100→S110→S135→S140. When the predetermined time duration TD has elapsed from the time point at which all the operation levers/pedals 20 to 24 enter the neutral states, the predetermined time duration counter 31*e* outputs the predetermined time duration counting completion signal. Then, the procedure follows Steps S50→S80→S100→S110→S120→S125→S130, and the switch circuit 31*g* outputs the rotation speed command generated on the basis of the low rotation speed Ni for auto idle control. Thereafter, by repetition of Steps S50→S80→S100→S110→S120→S125→S130, the switch circuit 31*g* keeps outputting the rotation speed command of the low rotation speed Ni.

In this state, when at least one of the operation levers/pedals 20 to 24 is manipulated, the determining section 31*c* stops outputting the non-manipulation signal. Accordingly, the procedure follows Steps S50→S80→S100→S110→S135→S140, and the predetermined time duration counter 31*e* is reset. Then, the switch circuit 31*g* outputs the rotation speed command generated on the basis of the reference rotation speed Nr, and thereafter keeps outputting the rotation speed command of the reference rotation speed Nr by repetition of Steps S50→S80→S100→S110→S135→S140.

Operation

Hereinbelow, on the basis of the functional block diagram of the controller 31 depicted in FIG. 3, an operation of the present embodiment is explained with reference to the flowchart depicted in FIG. 6.

In accordance with the reference rotation speed computation table 31*a* and the predetermined time duration computation table 31*d*, the reference rotation speed Nr of the electric motor 1 corresponding to the instruction signal of the rotation speed dial 34 is always computed (Step S50), and the predetermined time duration TD of auto idle control corresponding to the remaining electric power storage amount information about the electric power storage device 33 is computed (Step S52). When the auto idle switch 35 is turned on, and none of the operation levers/pedals 20 to 24 has not been manipulated for a time duration longer than the predetermined time duration TD computed in accordance with the predetermined time duration computation table 31*d*, the non-manipulation signal is output from the determining section 31*c*. Further, the predetermined time duration counting completion signal is output from the predetermined time duration counter 31*e*, and the auto idle control ON signal is output from the auto idle switch 35. Accordingly, the auto idle condition fulfillment signal is output from the AND circuit 31*f*. Because of this, the switch circuit 31*g* selects the low rotation speed Ni as the target rotation speed of the electric motor 1, and outputs the rotation speed command generated on the basis of the low rotation speed Ni. Accordingly, the electric motor 1 rotates at a low speed (Steps S50→S80→S100→S110→S120→S125→S130).

Since, when any one of the operation levers/pedals 20 to 24 is manipulated in such a state, the maximum value of the operation pressure exceeds XMPa. Accordingly, the output of the non-manipulation signal from the determining section 31*c* stops, and the output of the auto idle condition fulfillment signal from the AND circuit 31*f* also stops. Because of this, the switch circuit 31g selects the reference rotation speed Nr computed on the basis of the instruction signal of the rotation speed dial 34 as the target rotation speed of the electric motor 1, and outputs, to the inverter 32, the rotation speed command generated on the basis of the reference rotation speed Nr (Steps S50→S80→S100→S110→S135→S140). Thereby, the rotation speed of the electric motor 1 rises from the auto idle rotation speed Ni to the reference rotation speed Nr, and the hydraulic fluid is delivered from the hydraulic pumps P1, P2, and P3 at flow rates according to the reference rotation speed Nr. Thus, the actuators 12 to 19 are driven according to the manipulation of the operation levers/pedals 20 to 24, and desired work can be performed. In addition, at this time, the counting of the elapsed time at the predetermined time duration counter 31e is reset.

Next, where the operation levers/pedals 20 to 24 manipulated by an operator are returned to the neutral positions, and none of the operation levers/pedals 20 to 24 is no longer manipulated, the non-manipulation signal is output again from the determining section 31c, and the non-manipulation signal is input to the predetermined time duration counter 31e and the AND circuit 31f. The predetermined time duration counter 31e starts counting after receiving the non-manipulation signal from the determining section 31c. Where the time duration after the predetermined time duration counter 31e has started counting is equal to or shorter than the predetermined time duration TD computed in accordance with the predetermined time duration computation table 31d, the predetermined time duration counting completion signal is not output from the predetermined time duration counter 31e, and the auto idle condition fulfillment signal is not output from the AND circuit 31f also. Because of this, the switch circuit 31g outputs the rotation speed command generated on the basis of the reference rotation speed Nr, and the electric motor 1 keeps rotating at the reference rotation speed Nr (Steps S50→S80→S100→S110→S120→S125→S140). At this time, when the operator manipulates any one of the operation levers/pedals 20 to 24 again, the hydraulic pumps P1, P2, and P3 deliver the hydraulic fluid at flow rates according to the manipulation, and can drive the actuators promptly.

On the other hand, where the time duration after starting counting of the predetermined time duration counter 31e has exceeded the predetermined time duration TD computed in accordance with the predetermined time duration computation table 31d, the predetermined time duration counting completion signal is output from the predetermined time duration counter 31e, and the auto idle condition fulfillment signal is output from the AND circuit 31f. Because of this, the rotation speed command generated on the basis of the low-speed idle rotation speed Ni is output from the switch circuit 31g, and the rotation speed of the electric motor 1 switches from the reference rotation speed Nr to the low rotation speed Ni (Steps S50→S80→S100→S110→S120→S125→S130).

At this time, when the remaining electric power storage amount of the electric power storage device 33 is greater than the second threshold Eb, the predetermined time duration Ta which is a typical length for auto idle control is computed. Then, the rotation speed of the electric motor 1 switches to the low rotation speed Ni after a lapse of the predetermined time duration Ta, and a transition to auto idle control takes place.

On the other hand, when the remaining electric power storage amount of the electric power storage device 33 decreases, and the remaining electric power storage amount is equal to or smaller than the first threshold Ea, the predetermined time duration Tb is computed, which is shorter than the predetermined time duration Ta which is the typical length for auto idle control. Then, the rotation speed of the electric motor 1 switches to the low rotation speed Ni after a lapse of the predetermined time duration Tb, and a transition to auto idle control takes place.

In addition, while the remaining electric power storage amount of the electric power storage device 33 decreases from the second threshold Eb to the first threshold Ea, the predetermined time duration TD continuously decreases from Ta to Tb.

Advantages

In the thus configured present embodiment, in ca case where a transition to auto idle control takes place, when the remaining electric power storage amount of the electric power storage device 33 is equal to or smaller than the first threshold Ea. the predetermined time duration TD is set to be shorter than when the remaining electric power storage amount is greater than the first threshold Ea, and therefore, the electric power consumption amount during the predetermined time duration TD is reduced by the corresponding amount, and decrease in the remaining electric power storage amount is reduced when a transition to auto idle control takes place, in a case where the remaining electric power storage amount has lowered to be equal to or smaller than the first threshold Ea. As a result, it is possible to lengthen the duration over which the remaining electric power storage amount of the electric power storage device 33 lasts, and thereby to operate the hydraulic excavator for a long time with one charge.

In addition, while the remaining electric power storage amount of the electric power storage device 33 decreases from the second threshold Eb to the first threshold Ea, the predetermined time duration TD continuously decreases from Ta to Tb. Accordingly it is possible to change the predetermined time duration TD gradually without making an operator feel a sense of discomfort, and to attain favorable operability.

Modification Example

Figure 7:
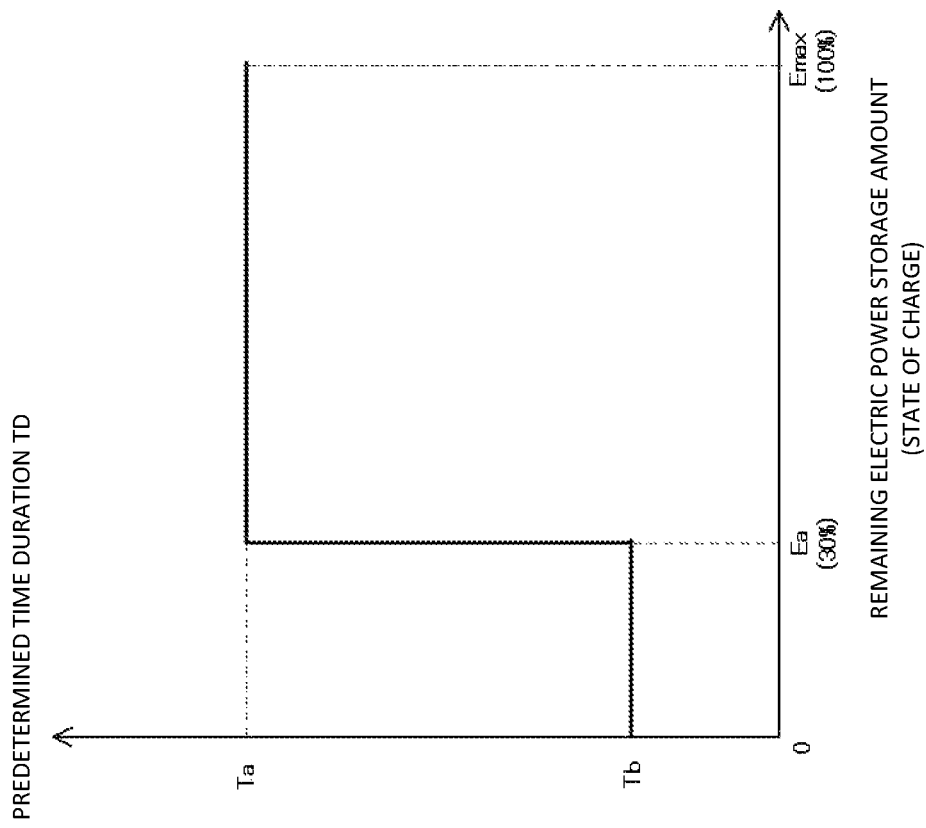
FIG. 7 is a figure depicting another example of the relationship between the remaining electric power storage amount and the predetermined time duration set in the predetermined time duration computation table.

FIG. 7 is a figure depicting another example of the relationship between the remaining electric power storage amount and the predetermined time duration TD set in the predetermined time duration computation table 31d.

In FIG. 7, the relationship between the remaining electric power storage amount and the predetermined time duration TD is set in the predetermined time duration computation table 31d such that: the predetermined time duration TD is constant at Ta during a time when the remaining electric power storage amount decreases from the maximum remaining electric power storage amount Emax to the first threshold Ea; and the predetermined time duration TD decreases to Tb stepwise when the remaining electric power storage amount further decreases from the first threshold Ea, and becomes constant at Tb after being decreased.

In this manner, even when the relationship between the remaining electric power storage amount and the predetermined time duration TD is set in the predetermined time duration computation table 31d, when the remaining electric power storage amount of the electric power storage device 33 has decreased to be equal to or smaller than the first threshold Ea, the predetermined time duration TD to be shorter than that when the remaining electric power storage amount is greater than the first threshold Ea in a case where a transition to auto idle control takes place, and therefore, the electric power consumption amount during the predetermined time duration TD is reduced by the corresponding amount, and, similarly to the embodiment described above, it is possible to lengthen the duration over which the remaining electric power storage amount of the electric power storage device 33 lasts, and thereby to operate the hydraulic excavator for a long time with one charge.

In addition, in this modification example, the predetermined time duration TD decreases from Ta to Tb stepwise when the remaining electric power storage amount decreases to be equal to or smaller than the first threshold Ea. Accordingly, it is possible to make an operator notice that the remaining electric power storage amount is approaching a remaining amount indicative of the necessity for charging. Thus, the frequency of unintentional stops of the hydraulic excavator can be reduced that is due to running out of the remaining electric power storage amount of the electric power storage device.

Second Embodiment

Figure 8:
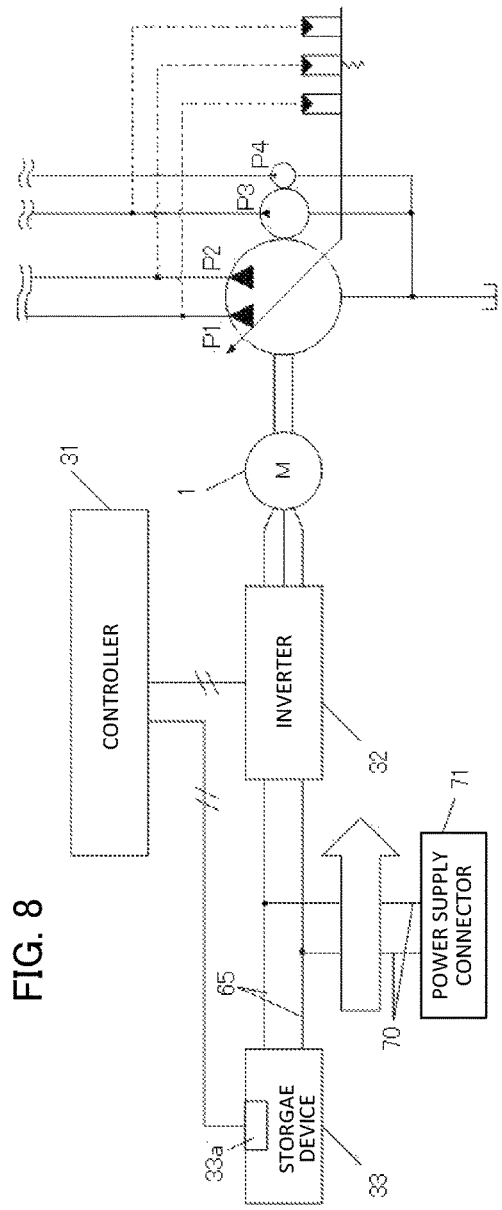
FIG. 8 is a figure depicting the electrically driven hydraulic excavator driving system according to a second embodiment of the present invention, and is a figure depicting a case where an electric motor is driven with electric power of an electric power storage device.
Figure 9:
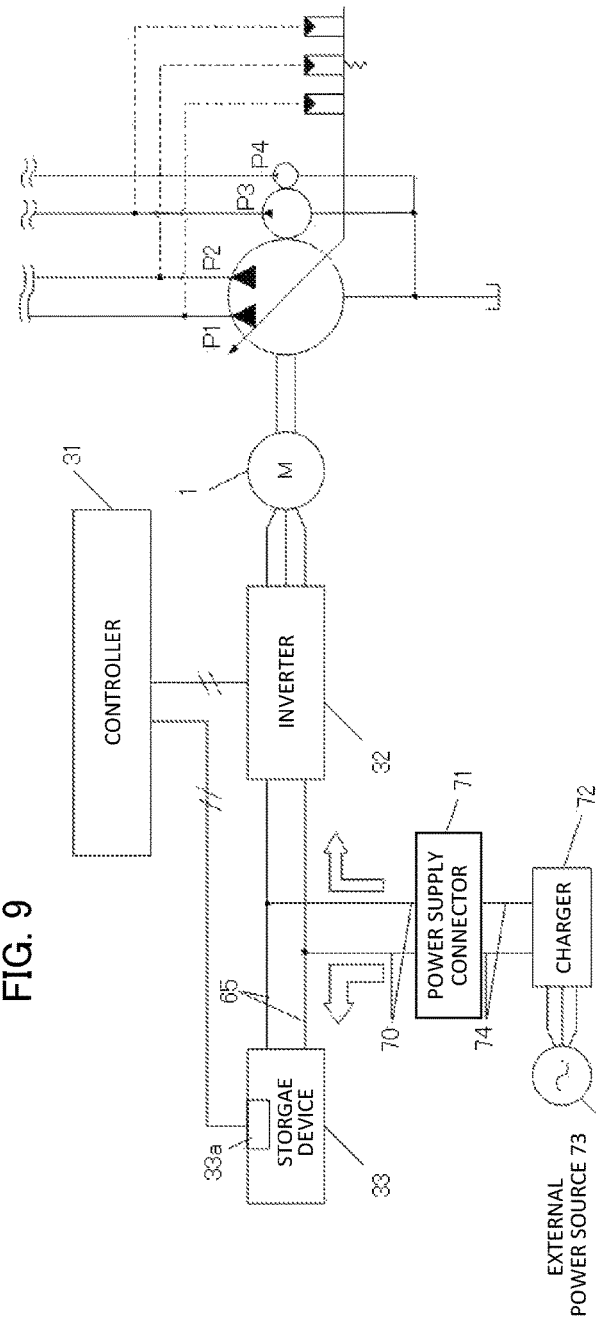
FIG. 9 is a figure depicting the electrically driven hydraulic excavator driving system according to the second embodiment of the present invention, and is a figure depicting a case where the electric motor is driven while the electric power storage device is being charged with electric power of an external power source.

A second embodiment of the present invention is explained by using FIG. 8 and FIG. 9.

FIG. 8 and FIG. 9 are figures depicting the electrically driven hydraulic excavator driving system according to the second embodiment of the present invention. FIG. 8 depicts a case where the electric motor 1 is driven with electric power of the electric power storage device 33. FIG. 9 depicts a case where the electric motor 1 is driven while the electric power storage device 33 is being charged with electric power of an external power source.

In FIG. 8 and FIG. 9, the driving system of the present embodiment further includes a power supply connector 71 for connecting an external power source 73 to the electric power supply line 65 via a charger 72. The charger 72 is connected to the power supply connector 71 via an electric power supply line 74.

In FIG. 8, the electric power storage device 33 is connected to the inverter 32 via the electric power supply line 65, and, as represented by the outline arrow, electric power of the electric power storage device 33 is supplied to the inverter 32 via the electric power supply line 65 to drive the electric motor 1.

When the electric power storage device 33 is charged, as depicted in FIG. 9, the electric power supply line 74 is connected to the power supply connector 71, and the external power source 73 is connected to the power supply connector 71 via the charger 72. In this state, when an operator turns on a start switch of the hydraulic excavator, as represented by one of the two outline arrows, electric power of the external power source 73 is supplied from the charger 72 to the electric power storage device 33. At this time, the charger 72 outputs a current according to the remaining electric power storage amount (voltage) of the electric power storage device 33 to charge the electric power storage device 33, and, when the voltage of the electric power storage device 33 reaches a set voltage, ends the charging.

In addition, where the electric motor 1 is driven during the charging of the electric power storage device 33, as represented by the other outline arrow, the inverter 32 receives, from the charger 72, a current necessary for the driving of the electric motor 1. Then, the electric power storage device 33 is charged with the remaining current of the charger 72, and the electric motor 1 can be driven to perform work while the electric power storage device 33 is being charged.

In addition, as explained about the first embodiment, when the remaining electric power storage amount of the electric power storage device 33 is equal to or smaller than the first threshold Ea, the predetermined time duration TD during which a transition to auto idle control takes place is Tb which is shorter than Ta, and by an amount corresponding to the reduction of the predetermined length of time TD, the electric power consumption of the electric motor 1 driven during the charging of the electric power storage device 33 is reduced. Because of this, an amount of electric power which is left unconsumed due to the reduction in the electric power consumption is allocated to the charging of the electric power storage device 33 when the electric motor is driven while the electric power storage device 33 is being charged. Thereby, the time duration for charging the electric power storage device 33 can be shortened by an amount corresponding to the reduction in the electric power consumption of the electric motor 1.

In this manner, in the present embodiment, by connecting the external power source 73 to the power supply connector 71 via the charger 72, it is possible to drive the electric motor 1 while charging the electric power storage device 33.

In addition, even when the electric motor 1 is driven while the electric power storage device 33 is being charged, the predetermined time duration TD during which a transition to auto idle control takes place is shortened, and thereby the electric power consumption of the electric motor 1 is reduced. Accordingly, it is possible to shorten the time duration for charging the electric power storage device 33 by an amount corresponding to the reduction of the electric power consumption of the electric motor 1.

Others

Whereas the electrically driven construction machine is a crawler type hydraulic excavator in the cases explained in the embodiments mentioned above, the electrically driven construction machine may be a construction machine other than a crawler type hydraulic excavator (e.g. a wheel type hydraulic excavator, a hydraulic crane, a wheel loader, etc.).

In addition, whereas the driving system includes three pumps, the first hydraulic pump P1, the second hydraulic pump P2, and the third hydraulic pump P3, in the cases explained in the embodiments described above, the number of hydraulic pumps may be one or two, and the present invention can be applied to any case no matter what the number of hydraulic pumps is.

Furthermore, whereas the pressure sensors 36 to 43 are used to sense whether or not the operation levers or operation pedals of the operation devices 20 to 24 are manipulated in the embodiments described above, instead of the pressure sensors, position sensors may be used to sense whether or not the operation levers or the operation pedals are manipulated. In addition, whereas a plurality of the pressure sensors 36 to 43 are used to sense whether or not the operation levers or operation pedals of the operation devices 20 to 24 are manipulated, a high-pressure selecting circuit including a combination of a plurality of shuttle valves that extract the highest pressure of the operation pressures of the operation devices 20 to 24 may be provided, one pressure sensor that senses the extracted pressure (the highest pressure) may be provided, and a sensing signal of the pressure sensor may be input to the controller 31. In this case, it is sufficient when the maximum value selecting section 31b in FIG. 3 is omitted from the controller 31, and the sensing signal of the pressure sensor is directly input to the determining section 31c.

DESCRIPTION OF REFERENCE CHARACTERS

1: Electric motor
3 to 5: Directional control valve
7 to 11: Directional control valve
20, 20a, 20b: Operation lever device (operation device)
21, 21a, 21b: Operation lever device (operation device)
22: Operation lever device (operation device)
23a, 23b, 24: Operation pedal device (operation device)
31: Controller
31a: Reference rotation speed computation table
31b: Maximum value selecting section
31c: Determining section
31d: Predetermined time duration computation table
31e: Predetermined time duration counter
31f: AND circuit
31g: Switch circuit
31h: Idle rotation speed setting section
33a: Electric power storage controller
36 to 43: Pressure sensor
P1: Hydraulic pump
P2: Hydraulic pump
P3: Hydraulic pump
Nr: Reference rotation speed
Ni: Idle rotation speed
TD: Predetermined time duration

The invention claimed is:

1. An electrically driven construction machine driving system comprising:
    an electric motor;
    a hydraulic pump driven by the electric motor;
    a plurality of actuators driven by a hydraulic fluid delivered from the hydraulic pump;
    a plurality of operation devices for operating the plurality of actuators;
    an electric power storage device that provides electric power to the electric motor; and
    a controller that controls a rotation speed of the electric motor, the controller being configured to drive the electric motor at a predetermined rotation speed when any one of the plurality of operation devices is manipulated, and execute auto idle control to lower the rotation speed of the electric motor from the predetermined rotation speed to a low-speed idle rotation speed when none of the plurality of operation devices is manipulated and a predetermined time duration has elapsed, wherein
    the controller is further configured to, when a remaining electric power storage amount of the electric power storage device is equal to or smaller than a first threshold, set the predetermined time duration to be shorter than when the remaining electric power storage amount is greater than the first threshold.

2. The electrically driven construction machine driving system according to claim 1, wherein
    the controller is configured to compute the predetermined time duration that continuously decreases during a time when the remaining electric power storage amount decreases from a second threshold greater than the first threshold to the first threshold.

3. The electrically driven construction machine driving system according to claim 1, wherein
    the controller is configured to compute the predetermined time duration that decreases stepwise when the remaining electric power storage amount decreases to be equal to or smaller than the first threshold.

4. The electrically driven construction machine driving system according to claim 1, further comprising:
    an inverter that is connected to the electric power storage device via an electric power supply line and drives the electric motor; and
    a power supply connector for connecting an external power source to the electric power supply line.

* * * * *